(12) United States Patent
Hasser

(10) Patent No.: US 6,564,168 B1
(45) Date of Patent: May 13, 2003

(54) HIGH-RESOLUTION OPTICAL ENCODER WITH PHASED-ARRAY PHOTODETECTORS

(75) Inventor: Christopher J. Hasser, San Jose, CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 09/661,580

(22) Filed: Sep. 14, 2000

Related U.S. Application Data (60) Provisional application No. 60/153,796, filed on Sep. 14, 1999.

(51) Int. Cl.[7] .............................................. G01D 5/34
(52) U.S. Cl. ..................... 702/163; 250/231.14; 73/650
(58) Field of Search .......................... 702/163; 235/492, 235/487, 488, 441; 250/231.14; 73/650

(56) References Cited

U.S. PATENT DOCUMENTS

| | | | |
|---|---|---|---|
| 3,919,691 A | 11/1975 | Noll | 340/172.5 |
| 4,103,155 A | 7/1978 | Clark | 250/231 |
| 4,385,836 A | 5/1983 | Schmitt | 356/374 |
| 4,546,347 A | 10/1985 | Kirsch | 340/710 |
| 4,560,983 A | 12/1985 | Williams | 340/825 |
| 4,637,264 A | 1/1987 | Takahashi et al. | 73/862.33 |
| 4,639,884 A | 1/1987 | Sagues | 364/565 |
| 4,676,002 A | 6/1987 | Slocum | 33/1 MP |
| 4,678,908 A | 7/1987 | LaPlante | 250/231 SE |
| 4,680,466 A | 7/1987 | Kuwahara et al. | 250/231 SE |
| 4,724,715 A | 2/1988 | Culver | 74/471 R |
| 4,728,954 A | 3/1988 | Phelan et al. | 342/115 |
| 4,776,701 A | 10/1988 | Pettigrew | 356/356 |
| 4,782,327 A | 11/1988 | Kley et al. | 340/365 P |
| 4,794,384 A | 12/1988 | Jackson | 340/710 |
| 4,795,901 A | 1/1989 | Kitazawa | 250/231 SE |

(List continued on next page.)

FOREIGN PATENT DOCUMENTS

| | | |
|---|---|---|
| EP | 0626634 A2 | 11/1994 |
| GB | 2347199 | 8/2000 |
| WO | WO/03319 | 1/2000 |

OTHER PUBLICATIONS

Klafter, R.D. et al., "Robotic Engineering: An Integrated Approach," Prentice–Hall, Englewood Cliffs, NJ, 1989, pp. 360–369.

Bhatti, P. et al., "Single Chip Velocity Measurement System for Incremental Optical Encoders," IEEE Trans. on Control Systems Technology, 11/97, pp. 1–30.

Ohmae, T. et al., "A Microprocessor–Controlled High–Accuracy Wide–Range Speed Regulator for Motor Drives," IEEE Trans. On Industrial Electronics, vol. IE–29, No. 3, Aug. 1982, pp. 207–211.

(List continued on next page.)

*Primary Examiner*—John Barlow
*Assistant Examiner*—Hien Vo
(74) *Attorney, Agent, or Firm*—Kilpatrick Stockton LLP (57) ABSTRACT

Embodiments of high-resolution optical encoders having phased-array photodetectors and integrated on semiconductor chips. Emitters, detectors, and encoders disks are described which can be easily produced with semiconductor processes, such as a detector array provided with lens to collimate light and enhance detection. Integrated sensor chips include an array of photodetectors that receive energy from a beam emitted from an emitter and modulated by an encoder disk, analog-to-digital converters, state machines, counters, a communication module, a sensor processing unit, and a force computation unit. One embodiment includes low resolution and high resolution modes and an emitter controlled by sensor circuitry. A detector for an optical encoder can be provided on a single chip that includes a first array of photodetectors used for absolute sensing of a moving object, and a second array of photodetectors used for incremental sensing of the moving object.

14 Claims, 8 Drawing Sheets

U.S. PATENT DOCUMENTS

| | | | | |
|---|---|---|---|---|
| 4,799,055 A | | 1/1989 | Nestler et al. | 340/710 |
| 4,823,634 A | | 4/1989 | Culver | 74/471 |
| 4,851,771 A | | 7/1989 | Ikeda et al. | 324/208 |
| 4,860,051 A | | 8/1989 | Taniguchi et al. | 250/231 SE |
| 4,868,549 A | | 9/1989 | Affinito et al. | 340/710 |
| 4,906,843 A | | 3/1990 | Jones et al. | 250/221 |
| 4,935,728 A | | 6/1990 | Kley | 340/709 |
| 4,965,446 A | * | 10/1990 | Vyse | 250/231.14 |
| 5,006,703 A | | 4/1991 | Shikunami et al. | 250/231.13 |
| 5,065,145 A | | 11/1991 | Purcell | 340/706 |
| 5,068,529 A | | 11/1991 | Ohno et al. | 250/231.18 |
| 5,079,845 A | * | 1/1992 | Childers | 33/355 R |
| 5,086,197 A | | 2/1992 | Liou | 178/18 |
| 5,095,303 A | | 3/1992 | Clark et al. | 340/710 |
| 5,138,154 A | | 8/1992 | Hotelling | 250/231.12 |
| 5,139,261 A | | 8/1992 | Openiano | 273/148 B |
| 5,168,268 A | | 12/1992 | Levy | 340/709 |
| 5,204,600 A | | 4/1993 | Kahkoska | 318/602 |
| 5,229,836 A | | 7/1993 | Nagano | 356/373 |
| 5,254,919 A | | 10/1993 | Bridges et al. | 318/560 |
| 5,355,148 A | | 10/1994 | Anderson | 345/166 |
| 5,359,193 A | | 10/1994 | Nyui et al. | 250/237 |
| 5,374,942 A | | 12/1994 | Gilligan et al. | 345/157 |
| 5,384,460 A | | 1/1995 | Tseng | 250/231.14 |
| 5,402,680 A | | 4/1995 | Korenaga | 73/518 |
| 5,452,615 A | | 9/1995 | Hilton | 73/862.043 |
| 5,477,237 A | | 12/1995 | Parks | 345/156 |
| 5,491,477 A | | 2/1996 | Clark et al. | 341/20 |
| 5,526,022 A | | 6/1996 | Donahue et al. | 345/156 |
| 5,543,821 A | | 8/1996 | Marchis et al. | 345/167 |
| 5,576,727 A | | 11/1996 | Rosenberg et al. | 345/179 |
| 5,589,828 A | | 12/1996 | Armstrong | 341/20 |
| 5,591,924 A | | 1/1997 | Hilton | 73/862.043 |
| 5,592,401 A | | 1/1997 | Kramer | 364/550 |
| 5,604,345 A | | 2/1997 | Matsuura | 250/237 G |
| 5,611,731 A | | 3/1997 | Bouton et al. | 463/37 |
| 5,623,582 A | | 4/1997 | Rosenberg | 395/99 |
| 5,625,576 A | | 4/1997 | Massie et al. | 364/578 |
| 5,628,686 A | | 5/1997 | Svancarek et al. | 463/36 |
| 5,694,153 A | | 12/1997 | Aoyagi et al. | 345/161 |
| 5,724,068 A | | 3/1998 | Sanchez et al. | 345/161 |
| 5,734,108 A | * | 3/1998 | Walker et al. | 73/650 |
| 5,734,373 A | | 3/1998 | Rosenberg et al. | 345/161 |
| 5,740,083 A | | 4/1998 | Anderson et al. | 364/585 |
| 5,742,278 A | | 4/1998 | Chen et al. | 345/156 |
| 5,749,577 A | | 5/1998 | Couch et al. | 273/148 B |
| 5,754,023 A | | 5/1998 | Roston et al. | 318/561 |
| 5,760,764 A | | 6/1998 | Martinelli | 345/160 |
| 5,763,874 A | | 6/1998 | Luciano et al. | 250/231.14 |
| 5,781,172 A | | 7/1998 | Engel et al. | 345/164 |
| 5,790,108 A | | 8/1998 | Salcudean et al. | 345/184 |
| 5,808,568 A | | 9/1998 | Wu | 341/20 |
| 5,808,603 A | | 9/1998 | Chen | 345/157 |
| 5,821,920 A | | 10/1998 | Rosenberg et al. | 345/156 |
| 5,825,308 A | | 10/1998 | Rosenberg | 341/20 |
| 5,841,133 A | | 11/1998 | Omi | 250/231.13 |
| 5,841,428 A | | 11/1998 | Jaeger et al. | 345/184 |
| 5,844,673 A | | 12/1998 | Ivers | 356/138 |
| 5,889,670 A | | 3/1999 | Schuler et al. | 364/186 |
| 5,929,846 A | | 7/1999 | Rosenberg et al. | 345/161 |
| 6,004,134 A | | 12/1999 | Marcus et al. | 434/45 |
| 6,020,876 A | | 2/2000 | Rosenberg et al. | 345/157 |
| 6,031,222 A | | 2/2000 | Carapelli | 250/231.13 |
| 6,067,077 A | | 5/2000 | Martin et al. | 345/161 |
| 6,078,876 A | | 6/2000 | Rosenberg et al. | 702/152 |
| 6,100,874 A | | 8/2000 | Schena et al. | 345/157 |
| 6,104,379 A | | 8/2000 | Petrich et al. | 345/157 |
| 6,166,723 A | | 12/2000 | Schena et al. | 345/184 |
| 6,211,861 B1 | | 4/2001 | Rosenberg et al. | 345/163 |
| 6,259,433 B1 | | 7/2001 | Meyers | 345/161 |
| 6,300,938 B1 | | 10/2001 | Culver | 345/161 |

OTHER PUBLICATIONS

Lemkin, M. et al., "Velocity Estimation From Widely Spaced Encoder Pulses," American Control Conference, Seattle, Washington, Jun. 1996, pp. 998–1002.

Brown, R. H. et al., "Velocity Observations from Discrete Position Encoders," Proc. IECON '87, 13$^{th}$ Annual IEEE Industrial Electronics Soc. Conf., Boston, MA, Nov. 1987, pp. 1111–1118.

Brown, R. H. et al., "Analysis of Algorithms for Velocity Estimation from Discrete Position versus Time Data," IEEE Trans. on Insustrial Electronics, vol. 39, No. 1, Feb. 1992, pp. 11–19.

Saito, K. et al., "A Microprocessor–Controlled Speed Regulator with Instantaneous Speed Estimation for Motor Drives," IEEE Trans. On Industrial Electronics, vol. 35, No. 1, Feb. 1988, pp. 95–99.

Helmers, Carl, "Robotics Age In the Beginning", Hayden Book Company, Hasbrouck Heights, NJ, 1983, pp. 12–19.

Meyer et al., "A Survey of Position Trackers," Presence, vol. 1, No. 2, 1992, pp. 173–200.

Kelley, A. et al., "MagicMouse: Tactile and Kinesthetic Feedback in the Human–Computer Interface using an Electromagnetically Actuated Input/Output Device," Dept. of Elec. Eng., Univ. of Brit. Columbia, 1993, pp. 1–27.

Burdea, Grigore et al., "Dextrous Telerobotics with Force Feedback–An Overview," Part 1, Dept. of Elec. and Comp. Eng., Robotica 1991, vol. 9, Jun. 1990.

Krueger, M., Perceptual Systems, *Artificial Reality*, 1983, pp. 55–75.

* cited by examiner

HIGH-RESOLUTION OPTICAL ENCODER WITH PHASED-ARRAY PHOTODETECTORS

CROSS REFERENCE TO RELATED APPLICATIONS

This application claims the benefit of U.S. Provisional Patent Application No. 60/153,796, filed Sep. 14, 1999 by Christopher J. Hasser, entitled "High-resolution, Low-power Optical Encoder with Phased-array CMOS Photodetectors," which is incorporated herein by reference.

BACKGROUND OF THE INVENTION

The present invention relates to sensing position and motion using sensor devices, and more specifically to sensing position and motion using optical encoder sensors.

Encoders are useful in many applications. In one application, computer interface devices such as joysticks, mice, track balls, steering wheels, etc. make use of encoders to determine the position of a user manipulatable object (manipulandum) in a workspace of the user object, and provide the position information to a host computer that is connected to the interface device. An encoder can be used to sense position of the manipulandum in one or more degrees of freedom. Haptic feedback interface devices are a form of interface device in which motion of the manipulandum is sensed and forces are output on the manipulandum or the device housing using actuators such as motors. Haptic feedback devices require accurate position sensing of a manipulandum to determine force output, especially force feedback devices which output forces on the manipulandum in its degrees of freedom.

Figure 1:
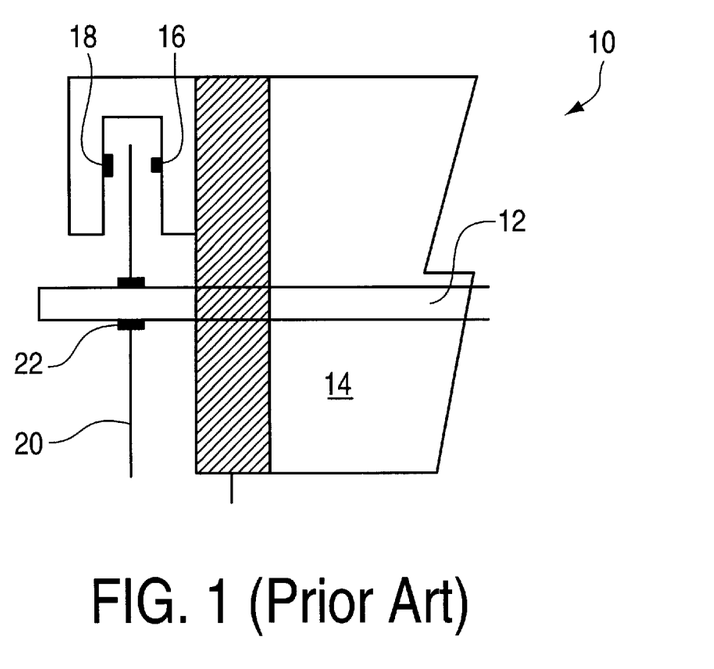
FIG. 1 is a side elevational view of an optical encoder.
Figure 2:
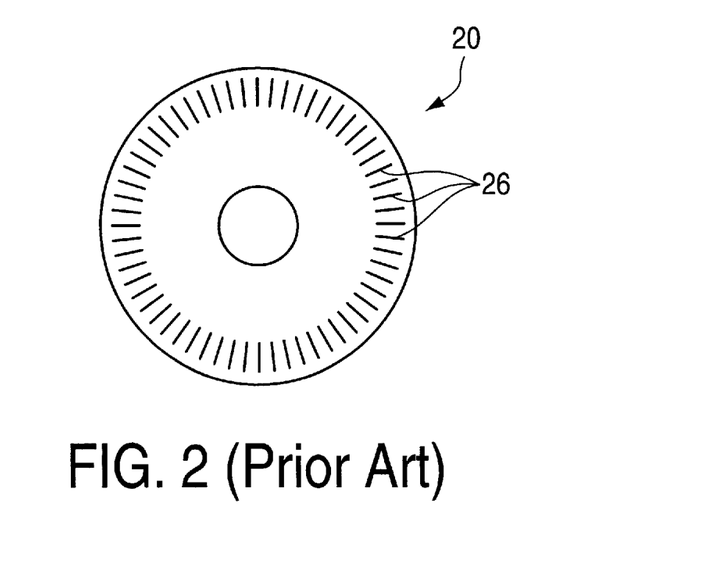
FIG. 2 is a top view of an encoder disk used in the encoder of FIG. 1.

Optical encoders use paired light sensors and light sources with mechanical interruptions to measure rotary or linear position. Rotary optical encoders are a widely-used form of digital sensor. Optical encoders used for sensing rotational motion typically include a spinning disk attached to a moving member such as a rotating motor shaft. For example, FIG. 1 is a diagram of an incremental rotary optical encoder 10 attached to a motor shaft 12 of a motor 14 to measure the angle of rotation of the shaft. A light source 16 emits a beam of electromagnetic energy toward a light sensor or detector 18 through an encoder disk 20 which is transparent or includes open slots. An encoder hub 22 couples the disk 20 to the shaft 12. Electronics 24 allows the necessary signals to pass to and from the source and detector. FIG. 2 shows the face of the optical encoder disk 20, with a striped pattern 26 of spokes or slits that provide periodic interruptions between the light source and light sensor as the motor shaft rotates. This creates a stream of pulses at the output of the detector.

The encoder 10 of FIG. 1 preferably uses two emitter-detector pairs (both emitters included in the light source 16 and both detectors included in the light sensor 18). If only one pair is used, the single output signal indicates motion, but cannot indicate which direction the encoder disk/shaft is turning. A practical encoder requires the addition of a second detector (and second emitter if appropriate) slightly offset from the first so that it produces a square wave pulse stream that is 90 (electrical) degrees out of phase with the first pulse stream, allowing the sensing of direction of motion, as is well known to those of skill in the art.

Optical encoders typically use LEDs to emit the light that passes through the encoder disk to the detector. While LEDs are an inexpensive, proven technology, they are far from ideal in many respects. The perfect optical encoder emitter would emit a bright, collimated light beam, and would require drive currents as low as practically possible. A bright emitter raises the signal-to-noise ratio of the sensor system. Collimated light projects a uniform pattern of shadows from the encoder disk that does not change size if the disk flutters closer to or farther from the emitter. Even distribution of light intensity simplifies the design of the detector. Low drive currents are especially important for battery-powered systems and devices running off of low-power buses such as those found in portable military and commercial systems.

Optical encoders use detectors to capture the light signals created by the emitter and rotating disk and convert them into electrical signals. After amplification and analog-to-digital conversion the TTL-compatible signal can be read by a microcontroller or data acquisition hardware. Two channel signals (one channel from each detector) are typical output of a ubiquitous quadrature optical encoder, using two photodetectors with channel signals offset by 90 degrees (¼ of the grid spacing interval on the encoder disk). High-resolution quadrature encoders, however, are typically large and expensive.

Optical encoder disks play a key role in determining the resolution and size of optical encoders. Higher resolution encoders require finer pitch grid patterns on the disks, or disks with larger circumferences which possess more grid lines per revolution. Manufacturers use various technologies to fabricate encoder disks. The cost and minimum grid pitch vary with the technologies. Most encoders use plastic film disks imprinted with standard lithographic methods. These disks can reliably accommodate a grid pitch as fine as 0.002". The cheapest technology, molded plastic disks, can only achieve a grid pitch of 0.040".

The performance of the optical encoder is determined by the characteristics of the emitter, the detectors, and the encoder disk. The required sensing resolution of the encoder largely determines the size of the encoder by influencing the size of the encoder disk. Making encoders smaller requires more precise fabrication of the encoder disk, better emitters, and more sophisticated detector arrays. However, any of these measures can become prohibitively expensive, especially for low-cost products in which the encoders are incorporated. For example, interface devices such as mice, joysticks, or the like could benefit greatly from smaller and more accurate optical encoders, but the cost of these devices must be kept low to remain competitive in the consumer market.

SUMMARY OF THE INVENTION

The present invention is directed to integrated optical encoder devices. The innovations herein can provide several components on an integrated circuit chip for enhanced performance and manufacturability.

More particularly, emitters, detectors, and encoders disks are described which can be easily produced with semiconductor processes. A detector array, for example, can be provided with lens to collimate light and enhance detection.

In another aspect of the present invention, an integrated sensor processing device detects motion of a moving member. The sensor device includes an array of a plurality of photodetectors that receive energy from a beam of electromagnetic energy emitted from an emitter, each photodetector outputting a signal indicating a detection of energy from the beam. Also included are at least one analog-to-digital converter, at least one state machine, a counter, and a communication module that provides a position to a controller. The integrated sensor processing device is provided on a single integrated circuit chip. Preferably, the communication module includes digital circuitry for providing serial data to the controller, which can be a microprocessor or other circuitry. The sensor processing device can be included in a haptic feedback device coupled to a host computer.

In other embodiments, the sensor integrated circuit chip also includes a sensor processing unit coupled to the counter and determining a velocity of the moving member, and a force computation unit coupled to the sensor processing unit and determining a force to be output by at least one actuator coupled to the force feedback computation unit. In yet other embodiments, digital logic circuitry on the chip is coupled to the analog-to-digital converters and selects one of the photodetector signals to provide a higher resolution than the other signals.

In another aspect of the present invention, a sensor device detects motion of a moving member and includes an emitter that emits a beam of electromagnetic energy, a moving member having an encoder pattern, an array of photodetectors that receive energy from the beam, and a mode selection circuit that can select a high resolution mode in which each detector provides the signal independently to permit a higher sensing resolution. The mode selection circuit can also select a low resolution mode in which at least two of the photodetectors are considered grouped and where the signals output by the grouped photodetectors are combined to achieve a lower sensing resolution than in the high resolution mode, where less power is consumed by the sensor device in the low resolution mode. For example, an emitter control circuit can control the emitter to output the beam for less power in low resolution mode, e.g. to pulse the beam with a greater off-time in low resolution mode than in high resolution mode, and/or to lower the intensity of the beam.

In another aspect of the present invention, a detector for an optical encoder includes a first array of photodetectors that receive energy from a beam emitted by an emitter of the optical encoder, where the first array is used for absolute sensing of the moving member, and a second array of photodetectors is used for incremental sensing of the moving member, and where the first array and second array of photodetectors are included on a single semiconductor integrated circuit chip. An encoder disk can modulate the energy from the emitted beam onto the first array and the second array, and can include a Gray code pattern for modulating light onto the first array and a slot pattern for modulating light onto the second array.

The present invention advantageously provides an optical encoder including many components that enhance the sensing performance of the encoder and which are integrated on a single integrated circuit chip for easier manufacturability. For example, semiconductor emitters, focussing lens, absolute and incremental detector arrays, sensor processing circuitry, and force determination circuitry can all be provided on a chip. In addition, the low resolution and high resolution modes can provide enhanced functionality for a sensor chip.

These and other advantages of the present invention will become apparent to those skilled in the art upon a reading of the following specification of the invention and a study of the several figures of the drawing.

BRIEF DESCRIPTION OF THE DRAWINGS

FIG. 5b is a top view of a 2-D array of photodetectors producing signals similar to those of FIG. 5a;

DETAILED DESCRIPTION OF PREFERRED EMBODIMENTS

The present invention is concerned with the improvement of emitters, small detector arrays, and encoder disks in optical encoders. The encoders of the present invention have very small dimensions but provide high sensing resolution.

Emitters

Figure 3:
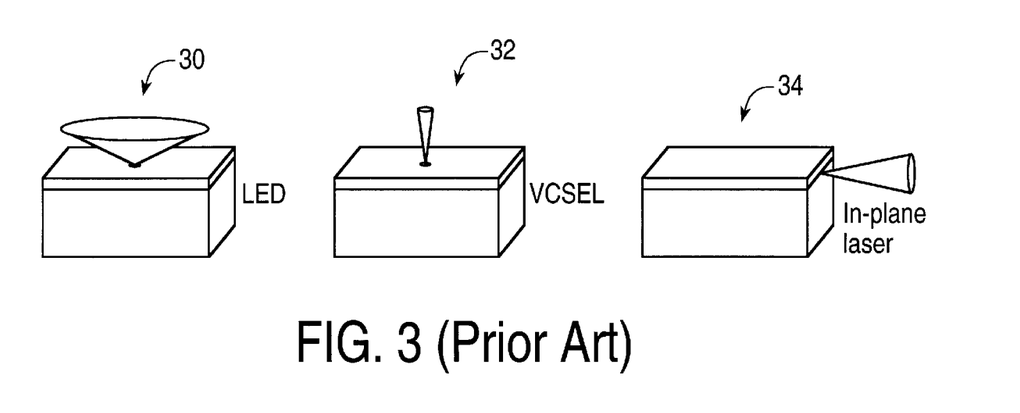
FIG. 3 is a perspective view of three different types of emitters.

One aspect of the present invention provides a vertical cavity surface-emitting laser (VCSEL) for use as an emitter in an optical encoder. FIG. 3 illustrates an LED 30, a VCSEL 32, and an in-plane laser 34 with their different emission patterns. In comparison with LEDs and similar light emitting devices, a VCSEL is closer to the ideal optical encoder emitter. Commercialized recently to drive optical communication fibers, VCSELs are tiny lasers formed on the surface of gallium-arsenide semiconductor chips. They emit more power with less drive current than an LED and focus that power into a smaller area because their light is much less divergent than that of LEDs (though still not perfectly collimated). VCSELs also have higher efficiency than in-plane lasers (used in CD players and laser pointers), and are less expensive to package because they do not need to stand on end like in-plane lasers.

Figure 4:
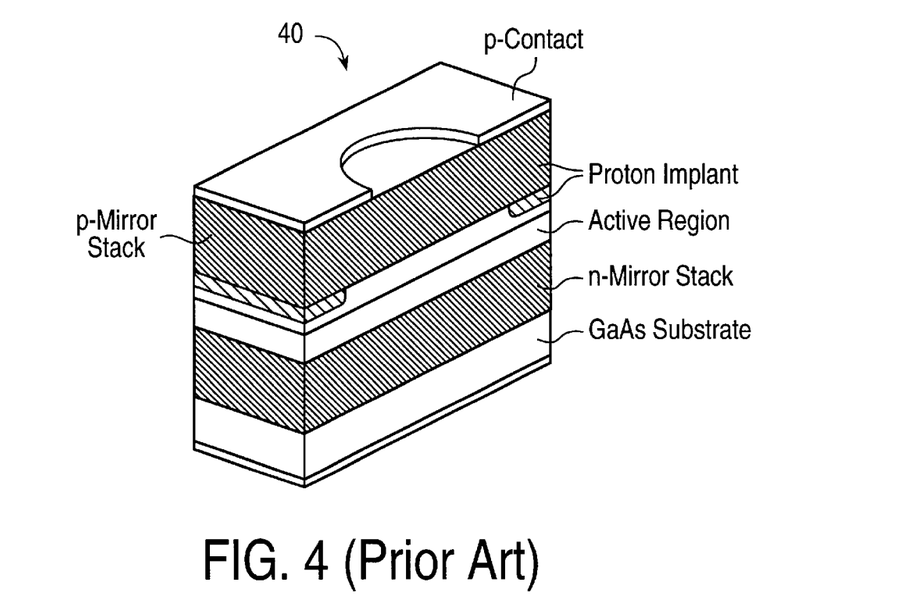
FIG. 4 is a perspective view of a VCSEL emitter structure.

FIG. 4 is a perspective view of a typical VCSEL structure 40. A VCSEL is fabricated using vertical stacks of mirrors above and below the semiconductor light emitting junction. It is a surface emitting laser because it emits light from the top surface of the semiconductor chip. The VCSEL structure is quite different from in-plane lasers 34 (also called edge emitters) which are made of horizontally-stacked laser cavities and emit light from the edge of the semiconductor chip.

Micro-electro-mechanical systems (MEMS) are typically referred to devices made using semiconductor fabrication methods. Since VCSELs condense the typical optics of a laser into a micro-device manufacturable with semiconductor technology, one can stretch the definition of MEMS to include VCSELs.

In one embodiment, custom VCSELs can be provided, and in other embodiments, off-the-shelf VCSELs (e.g., available from Honeywell Corporation) can be used. In some embodiments, VCSELs with lower forward currents and custom VCSEL arrays can be used. Also, in some embodiments, a MEMS lens can be positioned directly on a VCSEL emitter to collimate light.

Detectors

The phased array photodetector is a key component of a commercialized rotation sensor according to the present invention. The detectors of the present invention rely on two fundamental principles: generating more signals using more detectors with a higher spatial resolution, and using mixed-signal very large scale integrated circuit (VLSI) technology to efficiently process those signals right on a silicon semiconductor detector chip. The phased array of detectors allows for high resolution incremental sensing and a number of bits of absolute sensing (e.g., three bits). The sensor rejects ambient light effects, is not oversensitive to phase jitter induced by electrical device variations and mechanical manufacturing tolerances, is fast enough to meet optical encoder requirements, and is sensitive enough to give an acceptable signal-to-noise ratio when illuminated by a VCSEL or other emitter. All of the non-emitter innovations described in this application can be used with other types of emitters, such as LEDs, instead of a VCSEL.

The sensor of the present invention is a high-resolution, high-efficiency 2-D array sensor with high signal-to-noise ratio. Preferably, on-chip conversion to digital signals is provided, and on-chip motion-detection processing is used to deliver useful information to the sensor interface, rather than delivering a huge array of signals requiring laborious off-chip processing.

Figure 5A:
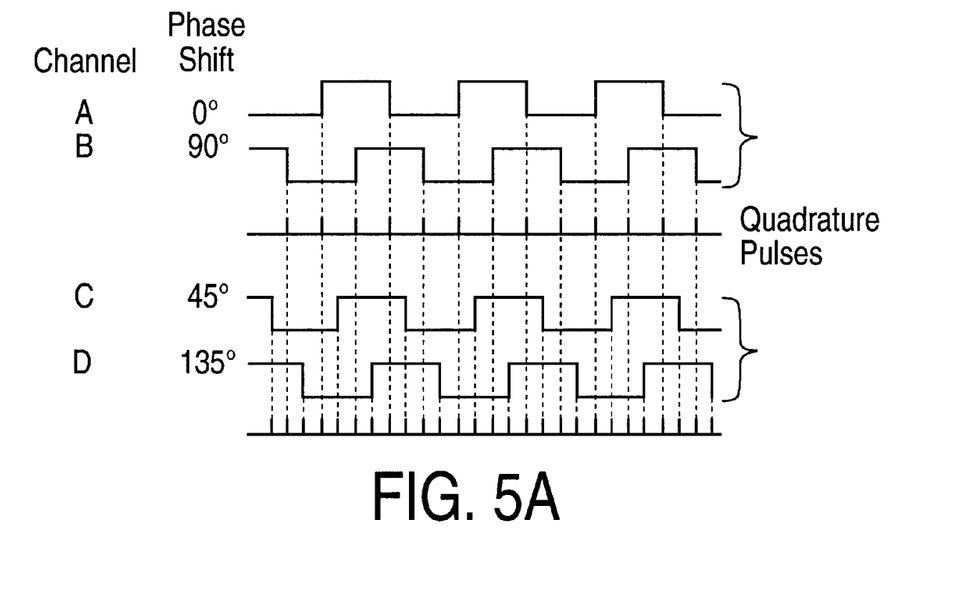
FIG. 5a is a graph illustrating four channels of signals output by sensor detectors.

A phased array of photodetectors is provided on a semiconductor chip and is used to generate a large family of pulsed signals. As illustrated in FIG. 5a, the array of photodetectors outputs multiple channels, preferably four or more to allow a higher sensing resolution ("octature" or greater), as described in patent application Ser. No. 09/071, 136, filed Apr. 30, 1998. Channels A and B are a typical output of a ubiquitous quadrature optical encoder, using two photodetectors with A and B channel signals offset by 90 degrees (¼ of the grid spacing interval on the encoder disk). Another approach, dubbed "octature," doubles resolution by using a phased array of four photodetectors each spaced 45 degrees apart. Channels C and D are the additional two outputs used in an octature embodiment, spaced between the signals for Channels A and B. Octature generates twice as many rising and falling edges, doubling the sensor resolution. One can extend the phased-array approach to include larger numbers of photodetectors spaced more closely together. Doubling or quadrupling the resolution of the detector array will double or quadruple the resolution of the rotation sensor. As resolution increases, the detector array essentially becomes a high-resolution image sensor.

Figure 5B:
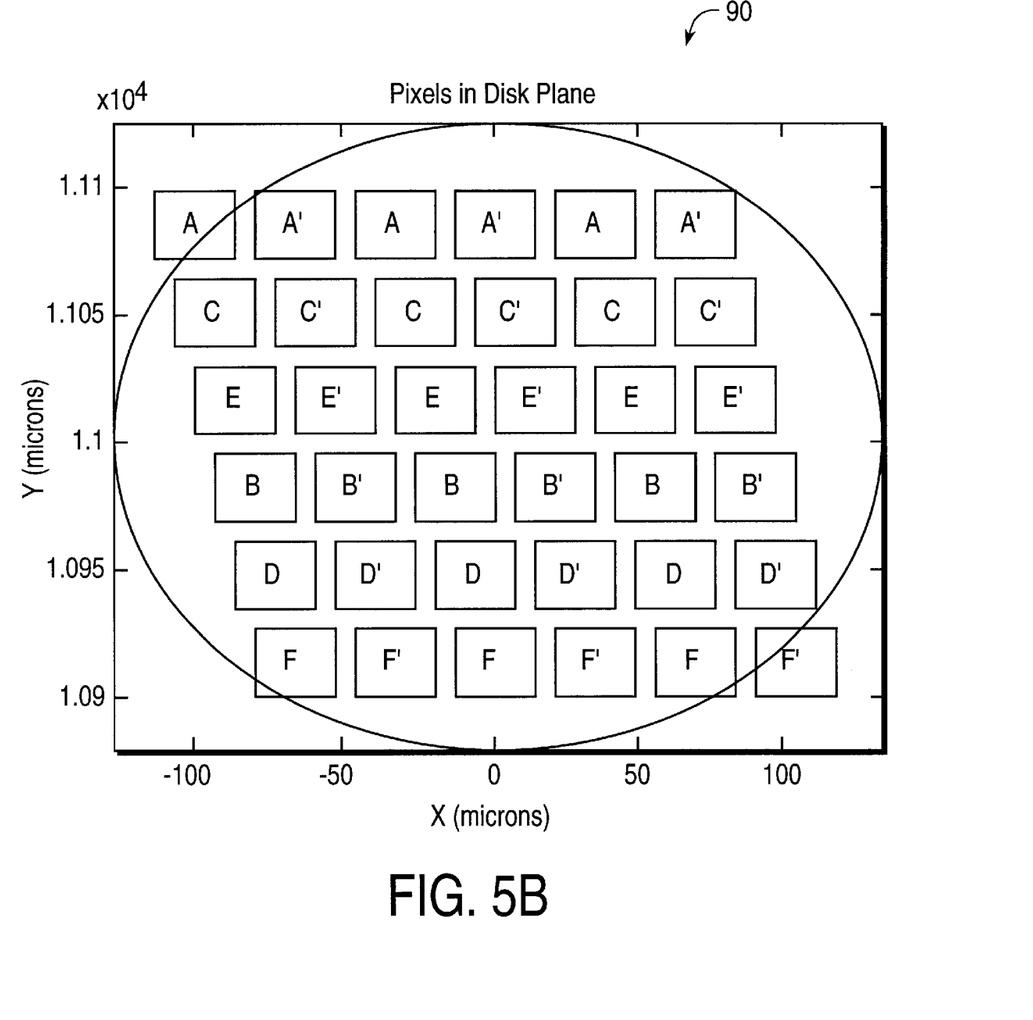

An example of a photodetector array 90 providing six channels is shown in FIG. 5b. Each horizontal row of photodetectors provides one channel signal for the array. The detectors A are all linked, the detectors A' are all linked, the detectors B are all linked, and so on, so that each set of linked detectors effectively forms a single photodetector; this is to allow greater light gathering ability for the array. Encoder slots that are aligned straight and vertical pass from left to right (or right to left) over the detectors and have a width the same as each photodetector, thus allowing a horizontal row of detectors to sense the emitted beam as the slots pass over. Each row includes alternating photodetectors, where a pair of adjacent photodetectors acts as differential sensors to cancel out ambient light and other noise. For example, the outputs of detectors A and A' are differenced to result in the actual photodetector signal for the A row of photodetectors. Each succeeding horizontal row is offset from the previous row by a small amount to provide the 30 degree phase difference. Each of the six rows provides a separate sensed channel 30 degrees out of phase with its surrounding channels, providing a high sensing resolution.

One embodiment of on-chip processing involves taking a family of pulsed signals and using a state machine and a counter to produce a position count that is delivered to a microprocessor or other controller. Smart image sensor technology with pixel-level information processing can allow inexpensive optical encoders to become more like the tiny hypersensitive eyes of a fly than large, crude light beam interrupters.

Advanced signal processing approaches may allow ultra-fine resolution with crude molded plastic optical encoder disks whose poor manufacturing tolerances create widely variable dimensions. This has obvious economic advantages for the commercial application of sensors incorporating the present invention. Techniques to do this can include intelligently tracking a single window/bar edge with high resolution and determining when the window or bar edge goes out of the view of the detector, then beginning to track a new window/bar edge (windows can also be called "slots"). This can help eliminate the need for the window/bar edges to be precisely spaced. This inexpensive implementation can have windows and bars molded in an arc directly on molded plastic voice coil motor arms that are described in co-pending patent application Ser. No. 08/881,691, filed Jun. 24, 1997, and co-pending patent application Ser. No. 08/965, 720, filed Nov. 7, 1997, both incorporated by herein by reference.

While phased-array detectors with pixel-level processing have great potential to improve the performance of optical encoders, the photodiode capacitance of the pixels slows their response. This is not a concern for camera sensors operating at slow frame rates, but is a great concern for optical encoders. Increasing photodetector size so the photodetectors capture more light will not improve detector speed, because photodiode capacitance increases linearly with photodetector area, canceling any speed benefits. Effective solutions for improving detector speed involve focusing more light on a detector of a given area.

One embodiment of the present invention focuses a greater amount of light on a detector of a given area in two ways: by using a high-intensity VCSEL as the illuminator, and by using MEMS lens arrays fabricated above the detector array.

Figure 6:
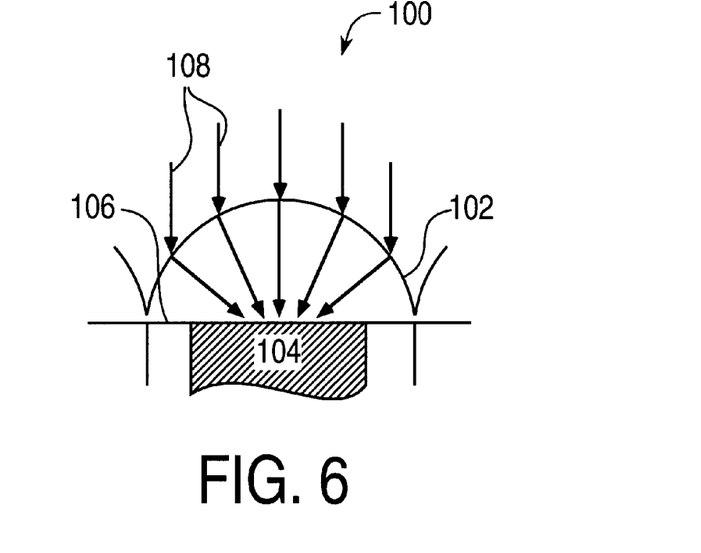
FIG. 6 is a side elevational view of a photodetector and a MEMS lens covering the photodetector.

FIG. 6 is a side elevational view of a detector assembly 100 of the present invention including a MEMS micro-lens 102 positioned above a photodetector 104 on a chip surface 106. Incoming light (or other electromagnetic energy) 108 is received by the lens 102 and focussed onto the photodetector 104. This increases the photodetector's light gathering capacity without increasing the area of the photodetector. Preferably, multiple assemblies 100 are provided adjacent to each other on a chip's surface to provide the multiple signals used in quadrature and octature sensing.

The MEMS lens positioned directly on the detector chip focuses more light on a detector pixel, increasing the signal-to-noise ratio and speed. MEMS lenses are usually made of silicon dioxide. The MEMS micro-lens arrays can be custom made to help increase response speed and signal/noise ratio.

Figure 7A:
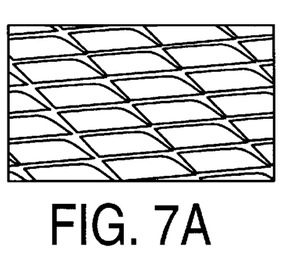
FIGS. 7a–7c are examples of MEMS lens arrays and FIGS. 7d–7f are the corresponding light patterns needed for the lens arrays.
Figure 7B:
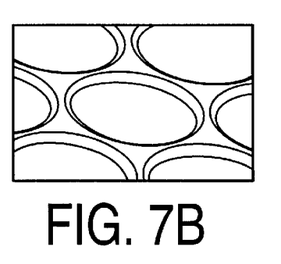
Figure 7C:
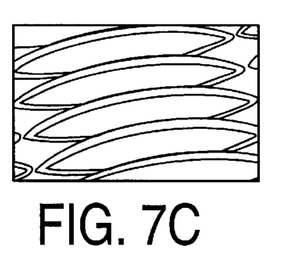
Figure 7D:
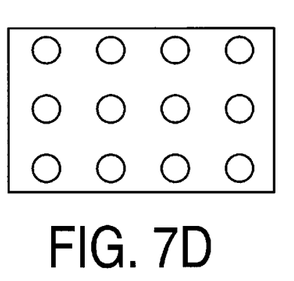
Figure 7E:
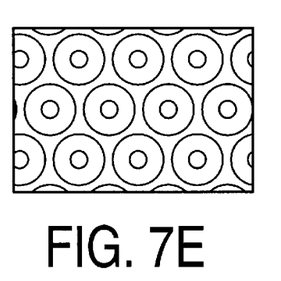
Figure 7F:
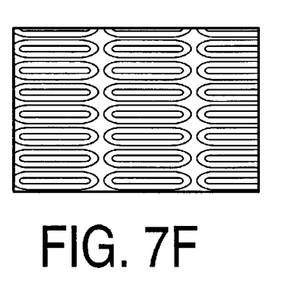

FIGS. 7a, 7b, and 7c illustrate a number of possible array configurations and lens shapes that can be used in the lens detector embodiment of the present invention. These types of lens arrays are available from MEMS Optical Inc, of Huntsville, Ala. FIGS. 7d, 7e, and 7f illustrate the light patterns corresponding to each of the configurations shown in FIGS. 7a–7c, where FIG. 7d corresponds to the array of FIG. 7a, FIG. 7e corresponds to the array of FIG. 7b, and FIG. 7f corresponds to the array of FIG. 7c. The photodetectors are preferably positioned to correspond to the light pattern of the lens array that is used in a particular embodiment.

Since both phased-array photodetectors and the microlenses are fabricated using standard CMOS processes, the MEMS lens arrays can be directly integrated onto the photodetector chips. Advanced detectors can include custom MEMS lens arrays, pixel-level information processing, and robustness to imperfections in the light pattern incident on the array.

Some embodiments of the integrated sensor chip of the present invention can provide photodetectors for absolute sensing and photodetectors for incremental (relative) sensing on the same detector semiconductor die. For example, absolute sensor photodetectors can be positioned on one part of the die and used for absolute position sensing; such sensing is well known to those skilled in the art. A different part of the die can include incremental sensor photodetectors, such as the detector array shown in FIG. 5b. Both of the photodetector arrays can be used in a particular application, e.g. using an encoder disk having a Gray code pattern section modulating the emitter light onto the absolute-sensing array, and an adjacent slot pattern section for modulating emitter light onto the incremental sensing array.

In some embodiments, the phased-array photodetector integrated circuit can include photodetector-level amplification and conditioning and analog-to-digital (A/D) conversion. For example, an amplifier and other conditioning circuits can be provided for each photodetector, to be operated in parallel as the photodetectors receive energy. This embodiment can create a low-noise digital sensor signal. Photodetector-level (pixel-level) signal processing can reduce parts costs and improve reliability by making the detector array "smarter" and immune to mechanical manufacturing irregularities in the rest of the system. In addition, an individual A/D converter (e.g., a Schmitt trigger with hysteresis) can be provided for each photodetector (or for each group of linked photodetectors) in the array (rather than for each channel). In some embodiments, one A/D converter can be used for each subset of the array, where a subset can be a row, column, or group of photodetectors logically grouped according to the optical encoder methods described herein. Photodetector-level processing can be very important for high-speed encoder operation because if this processing were shared between photodetectors, serialization of the information stream would be forced, thus slowing down information throughput.

In other embodiments, rather than (or in addition to) providing Boolean A/D conversion using a Schmitt trigger (or comparator), the photodetector pixels can use multi-level A/D conversion (analog encoder interpolation), allowing for higher-resolution position sensing. The multi-level A/D converter is included on the sensor IC chip. Digital logic, for example, can select which encoder signal provides the highest resolution at a given point in time. For example, a large group of sine wave signals can be produced by the phased array, with each sine wave offset by its neighboring sine waves by a phase shift. Digital logic can select the sine wave with the steepest slope at a particular point in time to provide the highest position resolution for a given voltage. When a group of sine waves is provided to select from (from the multiple sensor channels of the array), there is usually one with a steep slope available to be selected. This multi-level A/D conversion can provide several additional bits of sensing resolution; in an embodiment which also provides simultaneous Boolean A/D conversion, the bits from the Boolean conversion can be added to the bits of the multi-level resolution for a greater sensing resolution.

The multi-level A/D conversion embodiment can have other functions as well. High resolution is most important for many haptic feedback devices at slow speeds of a manipulandum or other moving member. It is advantageous if an encoder can automatically switch to the multi-level A/D converter described above when the encoder disk (and moving member) is rotating slowly, e.g. under a predetermined threshold velocity. If the signal-to-noise ratio is higher when the encoder disk is moving slowly, this can allow multi-level A/D conversion (which can be more demanding with respect to signal-to-noise ratio) to occur without having to increase the signal-to-noise specification of the system. For example, making multi-level A/D conversion work at fast speeds can be difficult due to signal-to-noise or other conversion circuit issues, but that is unnecessary in this embodiment since it is operated only (or its outputs ignored) at low speeds.

Low power or low current operation of a sensor can be achieved by a latching sensor. This type of sensor operates by pulsing the beam from the emitter, and the signals the detectors receives are latched. Each time the emitter is pulsed, the detector may change state.

Encoder Disks

Optical encoder disks play a key role in determining the resolution and size of optical encoders, as described above. Higher resolution encoders require finer pitch grid patterns on the disks, or disks with larger circumferences which posses more grid lines per revolution. The ideal encoder disk has extremely precise grid openings spaced as closely as possible. It also must be positioned very close to the detector to minimize the effects of light divergence and disk flutter (and as far away from the emitter as possible). It needs to rotate about a precisely placed center hole, be as small as possible, and have negligible radial wobble.

The MEMS encoder disk of the present invention has many of these ideal properties. The size of the encoder disk and assembly cost can be substantially reduced if a MEMS fabrication of an encoder disk is performed. The MEMS encoder disk can be fabricated directly over the detector chip, i.e. integrated on the chip or die. The disk is then separated from the chip or die and coupled to the moving member as a normal encoder disk. This can also reduce the problems associated with uncollimated light. Coupling a detector disk to a rotating motor shaft would likely involve a flexible coupling, e.g. a coupling that is flexible to bending but not to twisting would be advantageous.

Encoder Embodiments

Several embodiments of optical encoders are possible using the elements of a sensor described above. Misalignment of the emitter, disk, or detector will change the light pattern incident on the detector array. Thus, the sensor must be able to perform despite normal manufacturing variability.

Figure 8:
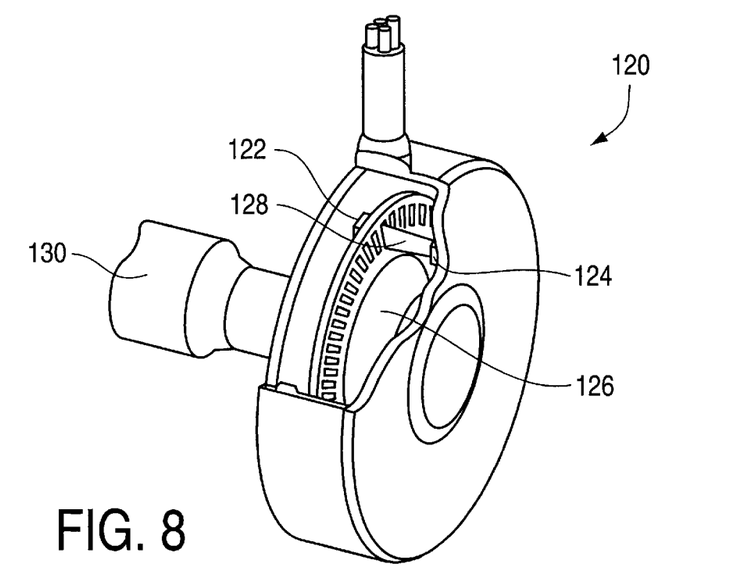
FIG. 8 is a perspective view of one embodiment of an optical encoder of the present invention including and emitter and detectors described herein.

FIG. 8 is a perspective view of one embodiment of an optical encoder 120 of the present invention. Encoder 120 includes a custom image phased-array detector 122, VCSEL emitter 124, and small metal encoder disk 126. A collimated light beam 128 is directed from the emitter 124 to the detector 122. The encoder disk 126 is coupled to a rotating motor shaft 130 (or other rotating member).

An example of a design according to the embodiment of FIG. 8 can use a package diameter of 0.4" and a disk radius of 0.15", with a phased array of detector pixels 0.1" from the center of the disk. A metal disk with grid lines spaced 0.010" apart on a 0.1" radius circle has 64 lines. With octature decoding, for example, this encoder generates 512 counts per revolution. Three photodetectors, combined with a Gray code pattern on the disk, can generate three bits of absolute rotation sensing for automatic calibration at startup. A different number of photodetectors and/or a different number of bits can be used for absolute sensing. Haptic feedback applications may require use of incremental encoders with much higher resolution.

Figure 9:
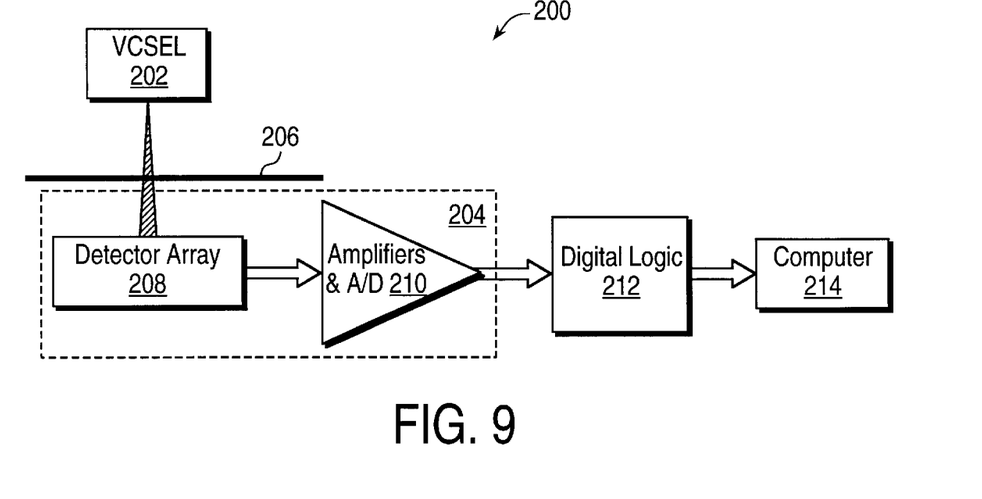
FIG. 9 is a block diagram of one embodiment of an optical encoder of the present invention.

FIG. 9 is a block diagram 200 illustrating one embodiment of the sensor of the present invention. A VCSEL emitter 202 is positioned to emit light onto a custom CMOS detector chip 204. An encoder disk 206 manufactured with conventional technology (such as etched metal) is positioned on the chip 204 between the VCSEL 202 and a detector array 208. The detector array 208 provides sensor signals to amplifiers and A/D converters 210 included in the chip 204. The amplifiers and A/D converters 210 provide output signals that are received by digital logic 212, which is shown external to the chip 204 but in alternate embodiments can be included on the chip 204. The digital logic 212 can provide position signals to the host computer 214, which can use the signals to position a cursor or otherwise manipulate a computer environment. The host computer 214 can be any of a variety of computer devices, such as a personal computer, workstation, game console, portable computer, set top box, arcade game machine, etc.

Some desired characteristics of one embodiment of the sensor can be specified for use with interface devices. Some examples of desirable characteristics in one embodiment follow. An incremental angular resolution of better than 360 counts/revolution can be provided, using a compact military encoder disk; an incremental angular resolution of better than 1,500 counts can be provided on a 35° 2" radius arc with civilian encoder disk segment (1.25" arc length). A desired incremental linear resolution allows detection of less than 0.0008" (20 micron) incremental motion of disk surface (to exceed 1,500 counts on a 1.25" arc segment for a commercial product). An absolute sensing of three bits across the sensor's range of motion is desired. The sensor should be able to respond to light pulses at 60 kHz or greater, and a desired reliability of the sensor allows zero skipped pulses even when subjected to mechanical shocks. The sensor can provide a TTL-compatible output signal.

A reflective or transmissive encoder design can be employed in any of the embodiments of the present invention. A reflective approach puts both the emitter and the detector on the same side of the disk and uses a reflective disk. This can reduce packaging costs, but may require more difficult optics design. The transmissive design described above provides an emitter on the opposite side of the disk to the detector array, where the disk modulates the light beam through slots.

Figure 10:
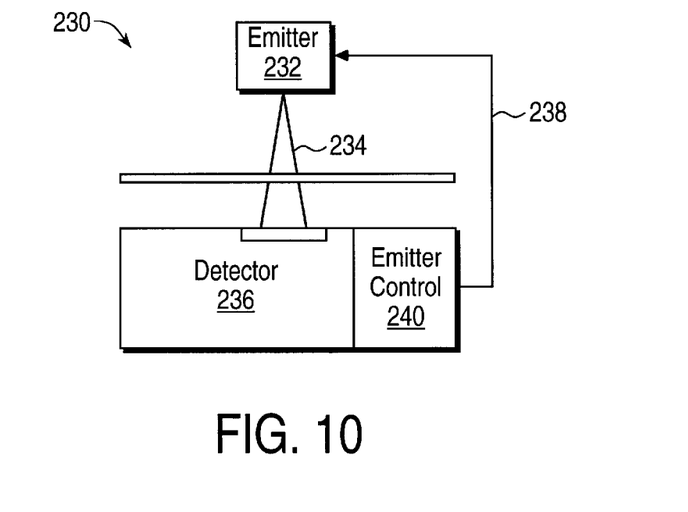
FIG. 10 is a block diagram of an optical encoder of the present invention including low resolution and high resolution modes.

FIG. 10 is a block diagram 230 of another embodiment of the present invention. In this embodiment, the optical encoder can include a low resolution mode providing lower sensing resolution but also consuming less power. If the emitted beam 234 is normally always on in high resolution mode, then in the low resolution mode, the beam 234 from emitter 232 can be pulsed and the received detector signals latched (as described above) so that power is not consumed during the off-times of the emitted beam. If the emitter is normally pulsed in high resolution mode, the beam can be pulsed with greater off-times in the low resolution mode. Alternatively, the intensity of the emitted beam can be lowered in low resolution mode. In some embodiments, the beam can be pulsed for greater off times as well has have its intensity lowered to save additional power.

Since less energy is being emitted in low resolution mode, a greater number of photodetectors can be used to sense the beam per sensing channel to create larger effective photodetectors that can sense the lower amount of energy. Thus, where each photodetector in high resolution mode may provide its own signal for its own phase in the multi-detector scheme (e.g., quadrature or octature sensing as described above), two or more photodetectors can be combined for each sensing channel in low resolution mode. For example, both of the current outputs from photodetectors A and B can be combined so that A and B effectively form a photodetector AB having double the light-collection area and that is able to sense the lower energy emitted beam. Of course, this lowers the sensing resolution or sensing speed of the sensor device since less sensing channels are used; in addition, sensor updates are fewer over time, providing less resolution. In other embodiments, only a subset of the photodetectors in the detector array are used in low resolution mode.

The low resolution mode can be useful for applications in which low resolution sensing is all that is required, while the higher resolution mode can be used in other applications where higher resolution is desired. For example, those encoders being included in standard (non-force feedback) mouse interface controllers can be set to low resolution mode since such controllers do not need to provide as high a sensing resolution. Those encoders provided in force feedback mice can be set to the higher resolution mode since force feedback typically requires higher sensing resolutions.

The embodiment described above having high and low resolution modes is ideally suited to include an emitter control circuit 240 integrated on the sensor chip. The sensor control chip 236 can be coupled to the emitter by a control line 238. For example, control signals from the sensor chip can be sent to an emitter 232 to control the rate of pulsing of the emitter, and/or the intensity of emitted light. Thus, when a low resolution mode is selected, the sensor device can immediately control the emitter to consume less power (e.g. by pulsing the emitted beam or by pulsing the beam more slowly) while simultaneously combining or grouping photodetectors in a low resolution configuration. The emitter control circuit on the sensor chip can also be used in other ways, e.g. to turn off the emitter at desired times.

Figure 11:
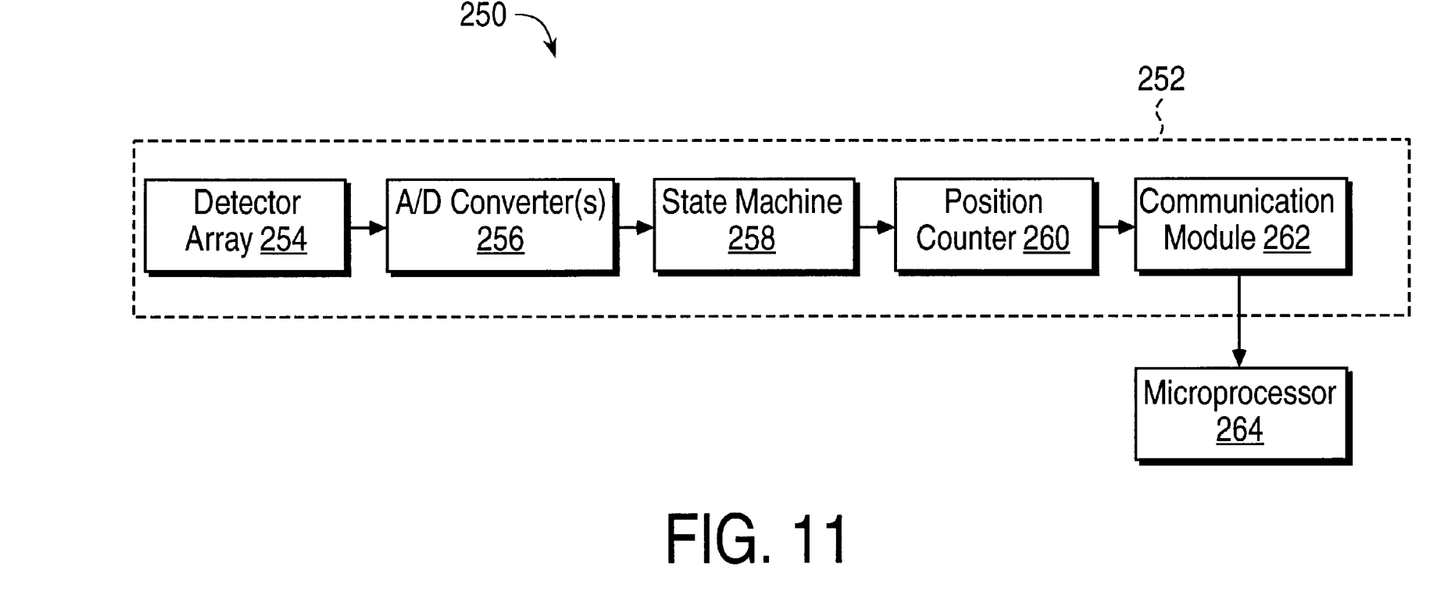
FIG. 11 is a block diagram illustrating a sensor of the present invention including signal processing on the sensor chip.

According to the present invention, the optical sensor can include various amounts of data processing devices on board the chip, depending on the embodiment. Such a sensor chip can integrate CMOS photodetectors, analog VLSI, and digital VLSI on the same chip. FIG. 11 is a block diagram 250 of one example, where a sensor chip 252 of the present invention includes a detector array 254 for detecting the emitted light, one or more A/D converters 256 (as discussed herein) to receive the detector array signals and convert them to digital form, a state machine 258 to receive the digital signals and produce a direction signal and a pulse signal therefrom, a position counter 260 to count the pulses to provide a position relative to a starting position of the moving member being sensed, and a communication module 262 to send out the position information from the counter 260. A controller, such as a microprocessor 264 or other control circuitry, can receive the position information. For example, the microprocessor 264 can be a local, embedded microprocessor in the interface device, separate from the host computer connected to the interface device. Or, the microprocessor 264 can be the host computer microprocessor also running a graphical environment (a GUI, game, simulation, application program, etc.).

Figure 12:
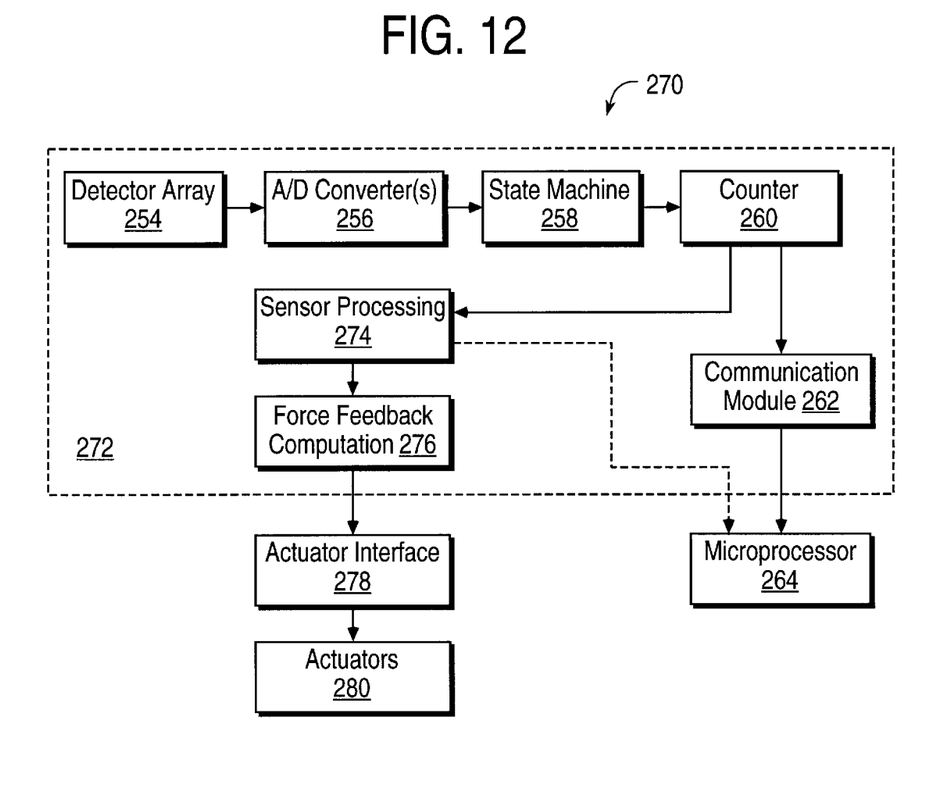
FIG. 12 is a block diagram illustrating a sensor of the present invention including additional processing components for force feedback devices.

FIG. 12 is a block diagram 270 illustrating another embodiment 272 of the sensor chip of the present invention, which is applicable. to use in force feedback interface devices. Sensor chip 272 can include a detector array 254, A/D converters 256, state machine 258, position counter 260, and communication module 262 as described above, and output the position information to a microprocessor 264. In addition, the sensor chip 272 can include sensor processing circuits 274, which preferably determine such information as velocity, acceleration, or other motion characteristics from a position received from the counter 260. For example, circuitry to provide encoder velocity computation (period measurement, nonlinear period measurement corresponding to direct velocity reading, or even a math processor to do 1/T division) can be included. Relevant descriptions for velocity computation appear in U.S. Pat. No. 5,999,168, and co-pending patent application Ser. No. 09/300,147, filed Apr. 27, 1999, both incorporated by reference herein. The sensor processing circuitry can provide velocity and other motion information to the microprocessor 264 in some embodiments, and the microprocessor can use such information in the determination of forces to be output by the interface device, for example.

In some embodiments, the sensor chip 272 can also include force feedback computation circuitry 276. Circuitry 276 can be a force processing unit of limited functionality, or the equivalent of a microprocessor. Circuitry 276 can take the position and velocity (and any other) information from sensor processing circuitry 274 and determine forces to be output by the force feedback device. Local memory can also be provided to store firmware describing the methods used to determine force values and other conditions governing the determination of forces. The force circuitry 276 can supply force values to an actuator interface 278 such as amplifiers, which output appropriate force values to actuators 280 of the device. Multiple chips 272 can also be used, where each chip 272 can be provided for a different degree of freedom of the interface device, and each circuit 276 controls a single actuator 280.

Force sensations or effects produced by the circuitry 276 can include detents, damping, spring return to center, and other innovations described in co-pending patent application Ser. No. 09/179,382, filed Oct. 26, 1998, and incorporated by reference herein. In one embodiment, the circuitry 276 controls closed loop force sensations, such as springs, damping, friction, etc. which are dependent on a position or velocity of the moveable manipulandum of the interface device; while a microprocessor 264 (local or host processor) determines open loop force sensations, such as vibrations, jolts, etc., which do not require current position or velocity information and thus need not be processed as quickly.

Examples of some sensing and actuator/force control innovations that can be included on a sensor chip can be found in U.S. Pat. No. 5,999,168, filed Feb. 21, 1997, and co-pending U.S. patent application Ser. No. 09/300,147, filed Apr. 27, 1999, which are both incorporated herein by reference. The sensor chip can in some embodiments include control electronics to perform data processing for a haptic feedback device such as a haptic knob, slider, joystick, mouse, or steering wheel. A rotary DC motor, voice coil, or moving magnet actuator with embedded motion sensor can be controlled with control electronics on the sensor chip. Some possible actuator configurations are described in co-pending patent application No. 60/133,208, filed May 7, 1999, and incorporated by reference herein. Some power transistors can be added to provide an independent module. The smart sensor chip can communicate via serial communication to peer modules (e.g., other integrated sensor chips performing position calculations and velocity determination, etc. for other degrees of freedom of an interface device) or to a central control microprocessor.

The sensor chip 252 or 272 can also allow serial communication. If intelligent processing is provided on the sensor chip that produces position data, velocity data, or other data or commands requiring interfacing to a microprocessor or other controller device, this interfacing can be implemented with a serial communication device, enabled by digital circuitry on the sensor chip. This serial communication can be made to conform to a standard such as $I^2C$, or a different standard.

In some embodiments, to achieve velocity sensing with very high speed operation, a microprocessor, or "smart sensor" electronics on the sensor chip itself, can intelligently control the speed of a clock timing the period, can adaptively change the number of bits of velocity resolution, and/or can switch between period measurement and encoder pulse counting as two alternative indications of encoder speed (pulse counting typically functions better at higher speeds).

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A sensor device comprising:
   an array of a plurality of photodetectors that receive energy from a beam of electromagnetic energy, said photodetectors operative to output signals indicating detection of energy from said beam; and
   a mode selection circuit communicatively coupled to said array of photodetectors, wherein said mode selection circuit is operable to select a first mode in which each of said detectors independently provides a signal,
   said mode selection circuit being operable to select a second mode in which at least two of said photodetectors are grouped to provide a signal.

2. A sensor device as recited in claim 1 further comprising an emitter control circuit that controls an emitter to output said beam such that less power is consumed in said second mode than in said first mode.

3. A sensor device as recited in claim 2 wherein said emitter control circuit controls said emitter to pulse said beam with a greater off-time in said second mode than in said first mode.

4. A sensor device as recited in claim 2 wherein said emitter control circuit controls said emitter to emit said beam at a lower intensity in said second mode than in said first mode.

5. The sensor device of claim 1 wherein said signal output by said grouped photodetectors provides a lower sensing resolution than in said first mode.

6. The sensor device of claim 1 wherein less power is consumed by said sensor device in said second mode than in said first mode.

7. A detector for an optical encoder, the optical encoder detecting motion of a moving member, the detector comprising:
   a first array of a plurality of photodetectors that receive energy from a beam emitted by an emitter of said optical encoder, each of said photodetectors operative to output a signal indicating a detection of energy from said beam, wherein said first array is used for absolute sensing of said moving member; and a second array of a plurality of photodetectors that receive energy from said beam emitted by said emitter, each of said photodetectors operative to output a signal indicating a detection of energy from said beam, wherein said second array is used for incremental sensing of said moving member;

wherein said first array and said second array of photodetectors are included on a single semiconductor integrated circuit chip.

8. A detector as recited in claim 7 wherein an encoder disk modulates said energy from said emitted beam onto said first array and said second array.

9. A detector as recited in claim 8 wherein said encoder disk includes a Gray code pattern for modulating light onto said first array of photodetectors, and a slot pattern for modulating light onto said second array of photodetectors.

10. An integrated sensor processing device comprising:

a photodetector array for outputting one or more analog signals;

at least one analog-to-digital converter for converting the analog signals to digital signals;

at least one state machine for receiving the digital signals, and outputting pulse and direction signals;

a counter for using the pulse and direction signals to determine a position of a moving member, the position being relative to a start point of the moving member;

a communication module for providing the position to a controller; and a mode selection circuit coupled to the photodetector array, wherein the mode selection circuit is operable in any one or more of a first mode and a second mode, the first mode for providing a first signal, and the second mode for providing a second signal that is lower in resolution than the first signal.

11. An integrated sensor processing device detecting motion of a moving member, the sensor processing device comprising:

an array of a plurality of photodetectors that receive energy from a beam of electromagnetic energy emitted from an emitter, each of said photodetectors operative to output a signal indicating a detection of energy from said beam;

at least one analog-to-digital converter coupled to said array of photodetectors, said analog-to-digital converter converting said signals from said photodetectors to digital signals;

at least one state machine coupled to said at least one analog-to-digital converter, said state machine outputting pulse and direction signals;

a counter coupled to said analog-to-digital converter that receives said pulse and direction signals and determines a position of said moving member from said pulse and direction signals, said position relative to an initial start point of the moving member;

a communication module coupled to said counter and providing said position to a controller;

wherein said integrated sensor processing device is provided on a single integrated circuit chip; and digital logic circuitry coupled to said at least one analog-to-digital converter, wherein said digital logic circuitry can select a first digital signal having a high resolution, and wherein said digital logic circuitry can select a second digital signal having a resolution lower than the first digital signal such that the amount of power consumed is reduced.

12. An integrated sensor processing device as recited in claim 11 wherein said digital logic circuitry selects said first digital signal having the steepest slope at the present position of said moving member.

13. An integrated sensor processing device as recited in claim 11 wherein said at least one analog-to-digital converter includes a multi-level analog-to-digital converter.

14. An integrated sensor processing device as recited in claim 13 wherein said multi-level analog-to digital converter is used with said digital logic circuitry and at least one other analog-to-digital converter is a single level comparator, and wherein said digital logic circuitry reads said digital signals only from said multi-level analog-to-digital converter when said moving member is moving under a threshold velocity.

\* \* \* \* \*